United States Patent Office 3,448,162
Patented June 3, 1969

3,448,162
PROCESS FOR REMOVING HYDROGEN FROM THE EFFLUENT STREAM OF A VACUUM DEHYDROGENATION UNIT
Glenn O. Michaels, South Holland, Ill., assignor to Sinclair Research, Inc., New York, N.Y., a corporation of Delaware
No Drawing. Filed Sept. 19, 1966, Ser. No. 580,176
Int. Cl. C07c *11/00, 5/18, 7/00*
U.S. Cl. 260—680               9 Claims

ABSTRACT OF THE DISCLOSURE

There is disclosed a method for selectively removing hydrogen from a vacuum dehydrogenation system. An aliphatic hydrocarbon containing about 3 to 20 carbon atoms is contacted with a dehydrogenation catalyst at dehydrogenation conditions including an elevated temperature of about 900–1200° F. The effluent, which contains an appreciable amount of hydrogen, is then contacted with an oxidation catalyst which serves to oxidize the hydrogen to water. The oxidation catalyst is a crystalline aluminosilicate having a uniform pore size of about 3 to 4 A. cation-exchanged with an oxidizing amount of a reducible metal oxide. The surface of the crystalline aluminosilicate is essentially free of the catalytically-active metal.

---

This invention relates to an improved process for dehydrogenation of paraffins to form olefins and diolefins. More particularly, this invention concerns a method for selectively removing hydrogen from the effluent stream of a vacuum dehydrogenation unit to effect an improved dehydrogenation process.

In the dehydrogenation of paraffins to form olefins and diolefins, vacuum operation is usually necessary or desirable in order to obtain favorable thermodynamic equilibria. Vacuum operation requires that the effluent gases from the reactor be compressed to atmospheric pressure or higher before the products are purified and recovered. Compressor costs represent a major part of the operation of a vacuum unit and in many commercial installations the capacity of the plant is limited by the capacity of the compressors. Thus, substantial improvement in capacity or reduction in operational cost can be achieved if undesirable gaseous products can be removed in dehydrogenation processes before the wanted gaseous products are compressed. Since the effluent stream in a dehydrogenation process usually contains a substantial amount of hydrogen, for instance, at least about 20% by volume and often as high as 50% or more, the removal of hydrogen before the compression stage of the process would represent a major reduction in the required compressor capacity.

In accordance with the process of the present invention the hydrocarbon to be dehydrogenated is first contacted with a dehydrogenation catalyst under dehydrogenation conditions to produce an effluent containing hydrogen. The effluent is then contacted with an oxidation catalyst to selectively convert hydrogen in the effluent to water without materially affecting the hydrocarbons which are present. The water can then be removed from the gaseous stream by drying methods well known in the art. By removing the hydrogen before the effluent passes to the compressor, the load on the compressor system is substantially reduced allowing the feed rate to the dehydrogenation unit to be increased without enlarging the compressor unit. Alternatively, the severity of the operating conditions can be increased to produce higher conversion levels and increased yields of olefins per pass. In still another embodiment of the invention, the effluent after hydrogen removal can be passed over a water-insensitive olefin dehydrogenation catalyst, for example a butene dehydrogenation catalyst, so that diolefin yields such as butadiene can be increased. Advantageously, the removal of hydrogen permits higher equilibrium yields of diolefins without any further purification steps.

The catalysts used in the dehydrogenation of this invention can be any of the solid dehydrogenation catalysts generally employed. These catalysts are often composed of a support which as alumina, magnesia, silica, of a combination thereof, which is promoted with a minor amount of one or more oxides of the metals of Groups IV, V, VI and VII of the Periodic Table. Specific examples of catalysts include alumina promoted with about 40% of any of chromium oxide, zirconium oxide, titanium oxide, and tin oxide; magnesia promoted with either about 20% molybdenum oxide or about 40% zirconium oxide; magnesia-alumina promoted with about 20% vanadium oxide; and unsupported active chromium oxide. A particularly effective catalytic composition for dehydrogenating paraffinic hydrocarbons is a catalyst containing about 40% chromia and 60% alumina which can be prepared by the method disclosed in U.S. Patent No. 2,755,323.

The oxidation catalyst of the present invention is a crystalline aluminosilicate component having uniform pore openings of about 3 to 4 angstrom units in size which has been cation exchanged with a reducible metal oxide such as, for example, copper oxide or tin oxide.

The use of metal oxides as oxidation catalysts in the treatment of hydrogen-containing dehydrogenation effluents is generally prohibitive because the oxides often have a catalystic effect on the hydrocarbons present in the reactor stream at the temperatures usually employed in dehydrogenation. Thus, instead of reacting selectively with the hydrogen, they tend to react with the hydrocarbons to form carbon dioxide, cracked products and other undesirable materials. This effect is particularly undesirable since the olefins and diolefins present in the dehydrogenation effluent, which are usually the most desirable products, tend to be preferentially attacked by these metal oxides.

In using the oxidation catalyst of the present process, however, the reducible metal oxide being supplied as a metal oxide-exchanged crystalline aluminosilicate, the hydrogen present in the dehydrogenation effluent stream is selectively oxidized to water with little or no effect on the hydrocarbon components present. The crystalline aluminosilicate, which in one form has been referred to as zeolite A (see U.S. Patent No. 2,882,243), absorbs molecules on the basis of their size and shape. The aluminosilicate has a sorption area available on the inside of the large number of uniformly sized pores of molecular dimensions. Using an aluminosilicate of about 3 to 4 A. pore size (rendered somewhat smaller due to the presence of the reducible metal oxide), molecules of the size and shape of, for example, hydrogen and water can freely enter the pores and be absorbed, while larger and differently shaped molecules such as branched hydrocarbons or straight chain hydrocarbons of 3 or more carbon atoms are excluded. Thus, by incorporating in the structure, through ion exchange, metal oxides which are reducible to lower valance states or to the free metal, as, for example, the oxides of copper or tin, the hydrogen is selectively converted to water with little, if any, effect on the $C_3$ or higher molecular weight hydrocarbon components present in the system.

Ion exchange of the crystalline aluminosilicate to form the oxidation catalyst used in the present invention may be accomplished, for example, by contacting the sodium form of the aluminosilicate with an aqueous solution of a soluble salt of the metal which will be converted upon calcination to the desired oxide. Thus, reducible metal oxides of, for example, copper or tin, can be selectively deposited in the pores of the crystalline aluminosilicate by cation exchange, deposition being followed by washing of the catalyst so that catalytically-active surface metal is substantially removed, drying and calcining, for instance, at temperatures of about 700 to 1300° F. or more, preferably about 800 to 1200° F. in an atmosphere of air or other gas. The reducible metal oxide thus introduced into the aluminosilicate will be present in oxidizing amounts, for example, from about 10 to 100%, on a molar basis, of the exchangeable cation, e.g., sodium, originally present in the aluminosilicate. Expressed in terms of weight percent, the reducible metal oxide, calculated as the free metal, may often be present in the catalyst in amounts from about 0.4 to 30%, based on the total weight of the catalyst in anhydrous form. For maximum hydrogen conversion it is often advantageous to have at least about 50% of the exchangeable cation of the aluminosilicate replaced by the reducible metal oxide. As the degree of exchange increases, a smaller amount of catalyst may be used for a given hydrogen conversion.

The feeds of the present invention are aliphatic (including cycloaliphatic and aromatic-substituted aliphatic) hydrocarbons of 3 to 20 or more carbon atoms, often of 4 or 5 to 12 carbon atoms. The feeds are usually nonacetylenic and often are saturated or olefinically unsaturated hydrocarbons. Whether the reaction or principal reaction occurring is a straight dehydrogenation as opposed to dehydrocyclization will be dependent in large part upon the feed selected. Both dehydrogenation to create one or two double bond-containing products and dehydrocyclization may occur with some feeds.

Should non-cyclic monoolefins and/or diolefins be the desired products the preferred feeds are aliphatic hydrocarbons of 4 to 6 carbon atoms, e.g. butane, isopentane, neohexane, etc., although as aforementioned they can have up to 12 or 20 carbon atoms. The feeds can be unsaturated but the preferred feeds are the normal and branched chain paraffins including the cyclic paraffins such as cyclopentane and cyclohexane. Equally suitable are aromatic feeds containing at least one or more dehydrogenatable aliphatic hydrocarbon groups, e.g., a lower alkyl group of, say, 2 to 4 carbon atoms such as ethylbenzene. Among the unsaturated feeds which can be used are the olefins of $C_4$ to $C_6$ range which undergo dehydrogenation to yield dienes. Perhaps the greatest advantage with respect to yields and selectivities of desired product is obtained with the branched feeds of at least five carbon atoms, usually up to 12 carbon atoms, which contain a "neo" or quaternary carbon atom.

In dehydrocyclization reactions the feed is usually a non-acetylenic, aliphatic hydrocarbon of 6 to 10 or up to, say, 20 carbon atoms and can be saturated or unsaturated. The preferred feeds for dehydrocyclization are branched chain hydrocarbons containing a chain length of at least 5 carbon atoms and at least 2 branched lower alkyl chains. Particularly preferred are the saturated branched feeds containing a quaternary carbon atom and a chain length of at least 5 carbon atoms. Also suitable feeds for dehydro-cyclization are naphthenes, including gem naphthenes, and aromatic hydrocarbons substituted with at least one aliphatic hydrocarbon, e.g., alkyl group, of 6 or more carbon atoms.

The dehydrogenation of the present invention is conducted at elevated temperatures, for instance, about 900–1200° F., preferably 950–1100° F. The total pressure may often vary from about 0.1 to 0.8, preferably 0.1 to 0.4, atmosphere, and the contact time or weight hourly space velocity, which may be dependent upon the catalyst, temperature and pressure employed, will generally range from about 0.1 to 10 or more, preferably about 0.5 to 5, WHSV (weight of hydrocarbon per weight of catalyst per hour). The dehydrogenation cycle time may often be from about 5 to 30 minutes, preferably 5 to 10 minutes.

In the present process, the oxidation catalyst can be placed in a separate reactor following the main dehydrogenation reactor or it can be placed in the main reactor as a separate layer or dispersed throughout the main catalyst bed. If the oxidation catalyst is incorporated in the same reactor with the dehydrogenation catalyst, the hydrogen produced as a result of dehydrogenation is selectively converted into water at dehydrogenation conditions. If oxidation of the hydrogen is conducted in a separate reactor, the hydrogen conversion can be effected at a temperature of, say, about 600 to 1200° F., preferably about 900–1200° F. The oxidation pressure may vary from about 0.1 to 0.8 atmosphere, preferably 0.1 to 0.4. The weight hourly space velocity will generally range from about 0.1 to 10 or more, preferably about 0.5 to 5, WHSV.

The amount of hydrogen in the dehydrogenation effluent which can be removed is a substantial amount and depends upon many factors such as, for example, the amount of reducible metal oxide present in the oxidation catalyst, the reaction temperatures, space velocity, etc. As a matter of economics it is often preferred to convert at least about 50% of the hydrogen in the dehydrogenation effluent. Thus it may be advantageous to essentially completely exchange the crystalline aluminosilicate with copper or tin or other metal oxides, as previously discussed. Since the vacuum unit in the dehydrogenation process may operate on relatively short cycle times, "cycle time" being the total time for reaction and catalyst regeneration, it is preferred to provide a sufficient amount of the reducible metal oxide to remove substantially all of the hydrogen during this period. In the interval during which the dehydrogenation catalyst is being regenerated, the reduced metal can be converted back to the oxide either by regeneration gases or a separate air stream.

The following examples will more particularly describe the present invention but are not to be considered as limiting.

EXAMPLE I 209 grams (175 cc.) of a commercial type alumina-chroma butane dehydrogenation catalyst (18–20 wt. percent $Cr_2O_3$, <0.5 wt. percent Na as $Na_2O$, balance $Al_2O_3$) is charged to a 1 inch Universal type reactor. This catalyst is then evaluated for the dehydrogenation of n-butane to form butenes and butadiene. The catalyst is regenerated after each run with air to burn off the carbon deposited on the catalyst. Conditions used for these runs and typical results obtained with this catalyst are shown in Table I, Run 1.

EXAMPLE II 96 grams of Reagent Grade $Cu(NO_3)_2 \cdot 3H_2O$ are added to 1500 cc. of water. To this solution is added 350 grams of Zeolon 8–10 A. mordenite; the mixture is heated to 80° C. for about 2 hours with stirring. The solid catalyst is removed from the mixture by filtering and the above procedure is repeated 2 more times. The exchanged catalyst is then washed with five 200 cc. portions of water, oven dried and calcined 3 hours at 1050° F. Analysis of the finished catalyst shows it to contain 4.10% copper. This catalyst is designated Cu"Z" in Run 2 of Table I. 123 grams of this copper oxide-exchanged Zeolon crystalline aluminosilicate catalyst is placed in a second reactor and heated to about 670° F. n-Butane is dehydrogenated in a main reactor at the conditions shown in Run 2 of Table 1 and the effluent from the main reactor is then passed over the copper-exchanged Zeolon catalyst in the second reactor before going to the collection system. The results are summarized in Table I, Run 2.

EXAMPLE III 350 grams of Linde's 4 A. Crystalline aluminosilicate (1/16 inch extrudate) is added to 1600 cc. of water containing 221 grams of Reagent Grade $Cu(NO_3)_2 \cdot 3H_2O$. The solution is heated to 80° C. for 2 hours with stirring. The mixture is then filtered and the process repeated 2 more times. The exchanged catalyst is then washed with five 700 cc. portions of water, oven dried, and calcined 3 hours at 1050° F. Analysis of the finished catalyst shows that it contains 12.2% Cu. This catalyst is designated Cu"A" in Run 3 of Table I wherein 150 grams of the Cu"A" is placed in the second reactor. As in Run 2, the catalyst effluent from the dehydrogenation reactor is passed over the copper oxide-exchanged 4 A. catalyst in the second reactor at a temperature of about 716° F. The data is summarized in Table I.

TABLE I
Feed: n-Butane (C.P.)
Catalyst (main reactor): Alumina-Chromia

| Run | 1 | 2 | 3 |
|---|---|---|---|
| Conditions (main reactor): | | | |
| Temperature, ° F | 1016 | 1018 | 1020 |
| WHSV | 1.10 | 1.04 | 1.05 |
| Exit pressure, mm. of Hg | 133 | 135 | 133 |
| Cycle time, minutes | 15 | 15 | 15 |
| Catalyst (2d reactor) | None | Cu"Z" | Cu"A" |
| Temperature, ° F. (2d reactor) | | 668 | 716 |
| Conversion of n-butane, mole percent | 42.5 | 38.3 | 41.0 |
| Selectivity to butadiene, mole percent | 16.8 | 10.8 | 17.0 |
| Selectivity to butenes, mole percent | 78.7 | 78.5 | 77.9 |
| Total selectivity, mole percent | 95.5 | 89.3 | 94.9 |
| Butadiene in effluent, mole percent | 7.12 | 4.12 | 6.95 |
| $H_2$ yield (Moles of $H_2$)/(Moles of butadiene) | 7.33 | 15.0 | 6.98 |

The difference in product distribution obtained using the Cu"Z" catalyst and the Cu"A" catalyst is apparent from the data in Table I. With the larger pore Cu"Z" catalyst present in the system, the selectivity to butadiene decreased from 16.8% to 10.8%, the mole percent butadiene in the effluent dropped from 7.12% to 4.12% and the total selectivity dropped from 95.5% to 89.3%. This data indicates that the Cu"Z" catalyst selectively attacks butadiene and butenes to give increased coke and cracked products. The increase in coke and cracked products is also reflected by increased yields of hydrogen which is undesirable; thus, when using no oxidation catalyst (Run 1) 7.33 moles of hydrogen are produced for every mole of butadiene, whereas with the Cu"Z" catalyst 15 moles of hydrogen are produced for every mole of butadiene. Using the catalyst system of the present invention (Run 3), however, water was produced, showing the oxidation of hydrogen in the effluent; high conversion and selectivity was maintained with about a 5% reduction in hydrogen yield.

Example IV 150 grams (162 cc.) of the Cu"A" catalyst is charged to the bottom section of a 1 inch Universal reactor. 150 grams (90 cc.) of the commercial alumina-chromia butane dehydrogenation catalyst of Example I is then placed in the upper section of the same reactor. This system is then evaluated for the dehydrogenation of n-butane in the same manner as in Examples I–III. Additional runs are made on the same commercial butane dehydrogenation catalyst with the Cu"A" catalyst removed. The results are summarized in Table II.

TABLE II
Feed: n-Butane (pure grade)

| | Run | |
|---|---|---|
| | 4 | 5 |
| | Catalyst | |
| | Alumina-chromia dehydrogenation | Alumina-chromia dehydrogenation +Cu"A" catalyst |
| Temperature, ° F | 1056 | 1067 |
| WHSV (based on dehydrogenation catalyst) | 1.12 | 1.18 |
| Exit pressure, mm. of Hg | 128 | 135 |
| Cycle length, min | 15 | 15 |
| Selectivity to butadiene, mole percent | 17.9 | 22.6 |
| Selectivity to butadiene+ butenes, mole percent | 88.9 | 87.9 |
| $H_2$ Yield (Moles of $H_2$)/(Moles of butadiene) | 8.2 | 2.8 |

As can be readily seen from Table II, by passing the effluent through the Cu"A" crystalline aluminosilicate catalyst the molar ratio of hydrogen to butadiene produced was reduced from 8.2 to 2.8. Also, the selectivity to butadiene was increased from 17.9 to 22.6 mol percent.

Example V

Employing the method of Example III, the 4 A. crystalline aluminosilicate is added to an aqueous solution of stannic chloride, the solution heated with stirring, and the crystalline aluminosilicate filtered off and washed with water. After repeating this treatment twice, the exchanged catalyst is oven dried and calcined 3 hours at 1050° F. The resulting tin oxide-exchanged 4 A. catalyst, when used in place of the Cu"A" oxidation catalyst in the dehydrogenation process of Example IV, similarly effects a reduction in hydrogen content of the butane dehydrogenation effluent stream.

It is claimed:

1. A method for selectively removing hydrogen from a vacuum dehydrogenation system which comprises contacting an aliphatic hydrocarbon containing about 3 to 20 carbon atoms with a dehydrogenation catalyst under dehydrogenation conditions including a temperature of 900–1200° F. to produce an effluent containing a substantial amount of hydrogen, and contacting said effluent with an oxidation catalyst to produce an effluent stream containing a reduced amount of hydrogen, said oxidation catalyst comprising a crystalline aluminosilicate having a uniform pore size of about 3 to 4 A. cation-exchanged with an oxidizing amount of a reducible metal oxide, said reducible metal oxide serving to oxidize the hydrogen to water, the surface of said crystalline aluminosilicate being essentially free of catalytically-active metal.

2. The process of claim 1 wherein the dehydrogenation catalyst and the oxidation catalyst are positioned in the same reactor.

3. The process of claim 1 wherein the dehydrogenation catalyst and the oxidation catalyst are positioned in separate reactors.

4. The process of claim 1 wherein the cation-exchanged crystalline aluminosilicate contains about 0.4 to 30 weight percent of reducible metal oxide, calculated as the free metal.

5. A method for selectively removing hydrogen from a vacuum dehydrogenation system which comprises contacting an aliphatic hydrocarbon containing from about 4 to 12 carbon atoms with a dehydrogenation catalyst under dehydrogenation conditions, including a temperature of about 950–1100° F., to produce an effluent containing a substantial amount of hydrogen, and contacting said effluent with an oxidation catalyst, to selectively oxidize the hydrogen to water and effect at least about a 50% reduction in hydrogen content, said oxidation catalyst comprising a crystalline aluminosilicate having a uniform pore size of about 3 to 4 A. cation-exchanged with an oxidizing amount of copper oxide, the surface of said crystalline aluminosilicate being essentially free of catalytically-active metal.

6. The process of claim 5 wherein the cation-exchanged crystalline aluminosilicate contains about 0.4 to 30 weight percent of copper oxide, calculated as the free metal.

7. The process of claim 5 wherein the aliphatic hydrocarbon is butane and the dehydrogenation effluent is a mixture of butene and butadiene.

8. The process of claim 4 wherein the dehydrogenation conditions include a total pressure of from about 0.1 to 0.8 atmosphere.

9. The process of claim 6 wherein the dehydrogenation conditions include a total pressure of from about 0.1 to 0.8 atmosphere.

References Cited

UNITED STATES PATENTS

| | | | |
|---|---|---|---|
| 2,398,301 | 4/1946 | Frevel | 260—681.5 |
| 2,831,042 | 4/1958 | Sieg | 260—680 |
| 3,136,713 | 6/1964 | Miale et al. | 260—681.5 X |
| 3,202,727 | 8/1965 | Dancer | 260—681.5 |
| 3,243,470 | 3/1966 | Davis et al. | 260—680 X |

PAUL M. COUGHLAN, *Primary Examiner.*

U.S. Cl. X.R.

260—681.5